(12) United States Patent
Ortega et al.

(10) Patent No.: US 9,350,782 B2
(45) Date of Patent: May 24, 2016

(54) METHOD AND SYSTEM FOR DELIVERING MEDIA DATA

(76) Inventors: Antonio Ortega, Los Angeles, CA (US);
Scott M. Darden, Arcadia, CA (US);
Asha Vellaikal, San Diego, CA (US);
Zhourong Miao, Los Angeles, CA (US);
Joseph Caldarola, Berkeley, CA (US)

( * ) Notice: Subject to any disclaimer, the term of this patent is extended or adjusted under 35 U.S.C. 154(b) by 0 days.

(21) Appl. No.: 10/059,282

(22) Filed: Jan. 29, 2002

(65) Prior Publication Data
US 2006/0031558 A1    Feb. 9, 2006

(51) Int. Cl.
| G06F 15/16 | (2006.01) |
| H04L 29/06 | (2006.01) |
| H04N 21/2343 | (2011.01) |
| H04N 21/2347 | (2011.01) |
| H04N 21/4788 | (2011.01) |
| H04N 21/63 | (2011.01) |
| H04N 21/647 | (2011.01) |
| H04N 19/61 | (2014.01) |

(52) U.S. Cl.
CPC .......... *H04L 65/80* (2013.01); *H04L 29/06027* (2013.01); *H04L 65/4084* (2013.01); *H04N 19/61* (2014.11); *H04N 21/2347* (2013.01); *H04N 21/234327* (2013.01); *H04N 21/4788* (2013.01); *H04N 21/632* (2013.01); *H04N 21/64792* (2013.01)

(58) Field of Classification Search
CPC ..................... H04L 2209/608; H04L 2209/08; H04L 2209/603; H04L 2463/101; H04L 2209/60
USPC ...................... 709/231, 247, 246; 726/26–33; 375/240.18; 705/51, 57, 52
See application file for complete search history.

(56) References Cited

U.S. PATENT DOCUMENTS

| 5,933,193 | A | * | 8/1999 | Niesen ..................... 375/240.12 |
| 6,075,906 | A | * | 6/2000 | Fenwick et al. ............. 382/298 |
| 6,104,757 | A | * | 8/2000 | Rhee ........................ 375/240.12 |
| 6,185,625 | B1 | * | 2/2001 | Tso et al. ...................... 709/247 |
| 6,285,774 | B1 | * | 9/2001 | Schumann et al. ........... 382/100 |
| 6,697,341 | B1 | * | 2/2004 | Roy .............................. 370/260 |
| 6,871,006 | B1 | * | 3/2005 | Oguz et al. ..................... 386/68 |
| 6,956,899 | B2 | * | 10/2005 | Hall et al. ................ 375/240.03 |
| 7,010,570 | B1 | * | 3/2006 | Boies et al. ................... 709/205 |
| 2002/0095582 | A1 | * | 7/2002 | Peled et al. ................... 713/180 |

OTHER PUBLICATIONS

IBM Global Services "Peer-to-Peer: More than just downloading music" May 29, 2001, Executive Tek Report., pp. 1-6 Printed from www.ibm.com.*
RFC 3003 "The audio/mepg Media Type" Nov. 2000.*

* cited by examiner

*Primary Examiner* — David Lazaro
(74) *Attorney, Agent, or Firm* — Artie Pennington Law Offices, PLLC

(57) ABSTRACT

For use in media communications, e.g. in the delivery of video and audio or in teleconferencing, a media file or title is partitioned for secured, efficient delivery. A data sequence representing the file is partitioned into smaller subsequences, with a first subsequence being chosen to convey a degraded-quality representation of the data, and the other sequences for complementing the first subsequence to obtain a superior-quality representation. Among areas of applicability are media on demand, real-time communications and broadcasting, and online media locker, jukebox and chat room services.

31 Claims, 4 Drawing Sheets

METHOD AND SYSTEM FOR DELIVERING MEDIA DATA

TECHNICAL FIELD

The present invention is concerned with techniques for transmitting and delivering media data in a communications network.

BACKGROUND OF THE INVENTION

Communications networks, e.g. the Internet, are finding increasing use for commercial delivery of proprietary media/multimedia data to clients/users. Such data is in digital form, and may represent a still image, a video sequence, or an audio sequence of voice or music, for example. Rendering of time-based digital media such as audio, speech or video involves producing a series of outputs over a period of time, e.g., a video frame every $\frac{1}{30}$-th of a second in the case of video NTSC output.

Where such data is proprietary, as under copyright, there are concerns with unauthorized access at intermediate points along the transmission path, as well as with users who have gained authorized access to the data then allowing others to copy and use the data without authorization. In view of such concerns, security measures are required for preventing contents from becoming available at intermediate points and for restricting access to the data to those who have been properly authorized. Such measures may include encryption as well as partitioning of data for transmission of the individual parts over distinct paths. In the latter case, parts are chosen so that no one of them provides a good approximation to the original content, thus requiring complete assembly of all parts for content to become available at good quality to an authorized recipient. Similar concerns arise with respect to security and privacy in communications over an open network, especially in real-time communication between users and in real-time broadcasting of potentially sensitive information.

Data representing media content tends to be voluminous, and its protection typically entails considerable complexity and transmission costs: in encryption, in transmission over a secure server, and in the use of streaming in preference to downloading to make copying more difficult.

SUMMARY OF THE INVENTION

Techniques of the invention can provide for protection of media data at reduced cost in that protective measures may be applied to one or several data subsets having a comparatively small size. The subset(s) can be selected such that protection of the complementary bulk of the data becomes less important.

For use in communicating time-based media, for example, a media title/file having a known format is partitioned/split for efficient delivery under security considerations. Among examples of time-based formats are MP3 audio and MPEG2 audio and video. A data set/sequence representing the title is partitioned into smaller subsets/subsequences, each having a specific access control mechanism, e.g., download-only, streaming-only or download-or-stream, and each being associated with reconstruction logic information for reassembly of the original title. A first of the subsets is chosen relatively large, yet to convey a degraded-quality representation of the title, and the others for complementing the first subset to obtain a superior-quality representation.

DETAILED DESCRIPTION

Requirements in Media Content Protection

Figure 1:
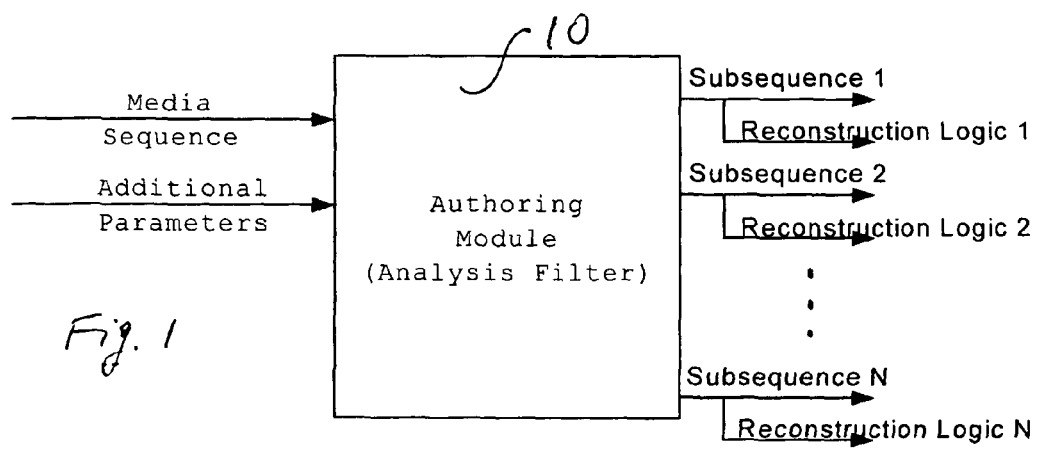
FIG. 1 is a schematic of operation of an authoring module.

Content protection for digital media serves to ensure that access to the content is restricted to those who have been authorized by the content owner, and that the access follows the rules set by the content owner. It may be required, for example, that user access to video content be limited to a certain number of viewings, or to viewing in a pre-specified window of time. In another example involving third parties, once a user has legitimate access to content, protection may be against his allowing others to copy and use the content without the originator's authorization.

As compared with providing copyright protection for published books, for example, protection in digital media delivery is more involved for two major reasons. First, copying digital content tends to be easy and can be performed without loss of quality in copying, especially when an open system, e.g. a PC, is used to view content. Second, content may be delivered in different forms, to different types of terminals. For example, one terminal may be a closed system, e.g. a TV set-top box, and another an open system such as a PC. Moreover, the distribution mechanism need not be uniform, as it may include means such as direct satellite broadcasting, Internet streaming, or distribution of content in a recorded physical medium such as a disk, for example. A content owner or service provider will seek to secure the content in all cases and regardless of differences in delivery formats and means.

There are three aspects of delivery systems which are considered as particularly important. First, decoder means should be inexpensive, as with set-top boxes or other hardware to be bought by the end user, and decoding should be fast, e.g. when effected in a PC. As the cost and complexity of decoding a video stream is fairly constant once a video compression standard has been selected, encoding should be secure without adding too much complexity in decoding. Second, complexity should be low also at the server, especially if the content has to be encrypted anew each time it is sent to a different user. As the complexity of both encryption and decryption typically scales with the total number of bits that need to be encrypted/decrypted, a scheme would be desirable that can provide a desired level of protection of content while encrypting the smallest percentage of bits. The third aspect is with content protection desirably offering easy preview of content.

Estimating the Level of Protection

In a cryptographic system, input data is mapped to an output through a reversible process determined by a key, typically making the output to appear as random. If the length of the output is N symbols and the alphabet size is M, a truly random output can be any one of $M^N$ different strings of symbols. In cryptography instead, the number of possible outputs depends on the size of the key, being equal to $2^L$ for a key with L bits. Through encryption with a key of length L bits, a given media content stream is mapped into one of $2^L$ possible streams. Then, on gaining access to the key, an end user can reverse the encryption process and access the content. The security of a cryptography system depends directly on key length, and so does computational complexity, in encryption as well as in decryption. For encryption of N bits of data, the over-all complexity is O(L·N) which can be substantial. For example, in the RSA cryptographic algorithm (named after its originators Rivest, Shamir and Adleman), encryption and decryption involve exponentiation by a large integer followed by a modulo operation.

In systems of the present invention, input data is processed to extract content-dependent key information whose length in bits here is denoted by L'. Such information can be extracted in different ways which share the following characteristics: (i) For a user without access to the data removed, the number of possible inputs that lead to the output observed by him is roughly $2^{L'}$, and (ii) L' can be very large without affecting the complexity of the system which is O(K·N), where K essentially depends on the algorithm but not on L'. Thus, without increased complexity in decoding with the key, the number of possibilities that have to be searched to obtain the original signal without the key can be made very large. Further encryption for protecting the L' key bits is not precluded. By selecting a suitable key extraction mechanism, a user can be provided with previews at a desired level of quality.

Extraction Algorithm

Of multimedia data, inexact copies can be useful. For example, in lossy compression, decoded signals differ from the original, yet are perceptually indistinguishable from it. Moreover, as described above, a standard lossy compression scheme can provide multiple compressed versions of the same signal, all of which can be decoded and displayed, albeit at different quality levels.

A compression system involves one encoder and at least one decoder. The encoder generates a compressed representation of the signal that can be read by the decoder to produce an approximation to the input signal. Open international standards developed to date, including such broadly used standards as MPEG-2 or JPEG, specify the syntax of the bit stream exchanged by encoder and decoder. Their goal is to maintain inter-operability between encoders and decoders of different vendors. The standards prescribe how the decoder should interpret a bit stream, and the operations to be performed on the data to reconstruct the signal. However, the standards documents do not specify how the encoding process needs to be performed, only how the encoder can represent the information to be sent to the decoder. Thus, many different encoding strategies can be employed while still preserving syntax compatibility with a standard decoder, e.g. as based on the MPEG-2 standard, in the sense of the decoder being able to decode the information.

For protection of compressed media files, a cryptographic algorithm customarily is applied directly to the compressed stream, which then is no longer syntax-compatible. Alternatively, if a cryptographic algorithm is applied to a portion of a stream, then even in cases where compatibility with a standard is preserved, quality may be degraded in an uncontrolled fashion. With such schemes, a preview of the media stream requires a separate, low-resolution file. Known techniques for providing the latter result in inefficiency, e.g., when a so-called scalable video coding is used, particularly when the preview is distributed first and the rest of the signal is provided only to those end users that have been granted access. In this case, the preview containing a small portion of the data is pre-positioned, i.e., available to the end user, and a large amount of additional data has to be transmitted to view the signal at the higher resolution. The additional data has the most value, and its encryption and decryption will be costly.

In a standard scalable system, two data sets are derived from an original compressed video, namely a base layer with rate Rb and an enhancement layer with rate Re, where Rb<<Re. For preventing unauthorized access beyond the low resolution preview, the enhancement layer has to be fully encrypted, or else a selective encryption would have to be performed to guard against decoding of the enhancement.

In accordance with an aspect of the present invention, designated as reverse scalability, a low-resolution preview file in fact contains most of the data, typically by a wide margin, so that Rb>>Re using the above notation. For example, and typically for preferred partitioning techniques of the invention, the low-resolution file contains at least 80% or even 95% of the total data. In partitioning, information can be removed at different stages of encoding, desirably while preserving syntax compatibility.

Privacy/Security in Network Communications

Characteristics of a reverse-scalable system are advantageous also for security and privacy in communications over an open network such as the Internet, especially in real-time applications such as VoIP (Voice over Internet Protocol), video conferencing, and real-time broadcasting where potentially sensitive information may be transmitted. As an example, for reasons of privacy a corporation will have reservations against use of an open network for conducting remote business meetings. Then, for economy over a purely private network, use of a so-called virtual private network (VPN) may be considered. Typically, such use is at a cost which directly depends on data volume, and the corporation will benefit from techniques for minimizing the amount of data transmitted over the VPN.

Specifically with respect to video data, for example, content can be separated into subsequences at the source, or at network gateways. A relatively small subsequence can be formed to convey key information, while a much larger subsequence provides a low-quality approximation to the signal which by itself may be essentially useless. Transmission of the small subsequence, encrypted, will be less costly as compared with secure transmission of the original content in its entirety, and the large subsequence may be transmitted openly and at low cost like a standard stream. Furthermore, as the large subsequence is in a standard format, standard techniques can be used for providing robust communication through the channel. For example, the transmission rate of the large subsequence can be varied by using rate control techniques to accommodate changes in network bandwidth. Also, the large subsequence can be separated into portions receiving different levels of error protection.

Description of Exemplary Methods for Reverse Scalability

FIG. 1 shows an authoring module 10 accepting media sequence input and additional parameter input, and generating N subsequences along with respective reconstruction logic. The authoring module 10 serves for analyzing/splitting the input sequence into the subsequences, and it generates the reconstruction logic for recombining some or all of the subsequences after their delivery. The reconstruction logic may be bundled together with the subsequences, or, in a different implementation, they can be made available independently. The subsequences can be delivered in various ways, such as downloading or streaming, for example.

In downloading, a data file is delivered in its entirety prior to its use, e.g. by direct server-to-client transfer, by transfer to the client from a third processor acting as caching proxy, or by a transfer from another user in possession of the file as in a so-called peer-to-peer network. Alternatively, in streaming, use of a data file overlaps in time with its delivery, with use starting as soon as a sufficient amount of information has been received. A few seconds worth of music is typical in the case of an audio file, for example, with playback continuing while additional data is being delivered. Processing for streaming is more complex as compared with downloading, and replicating such processing at several locations, e.g. mirrors or proxies in a network, tends to be costly. As an example of a low-cost system, in a peer-to-peer system, file distribution is based on downloading, with file content being obtained from different parts of a network. In such a system the central server may provide mere directory information.

Figure 2:
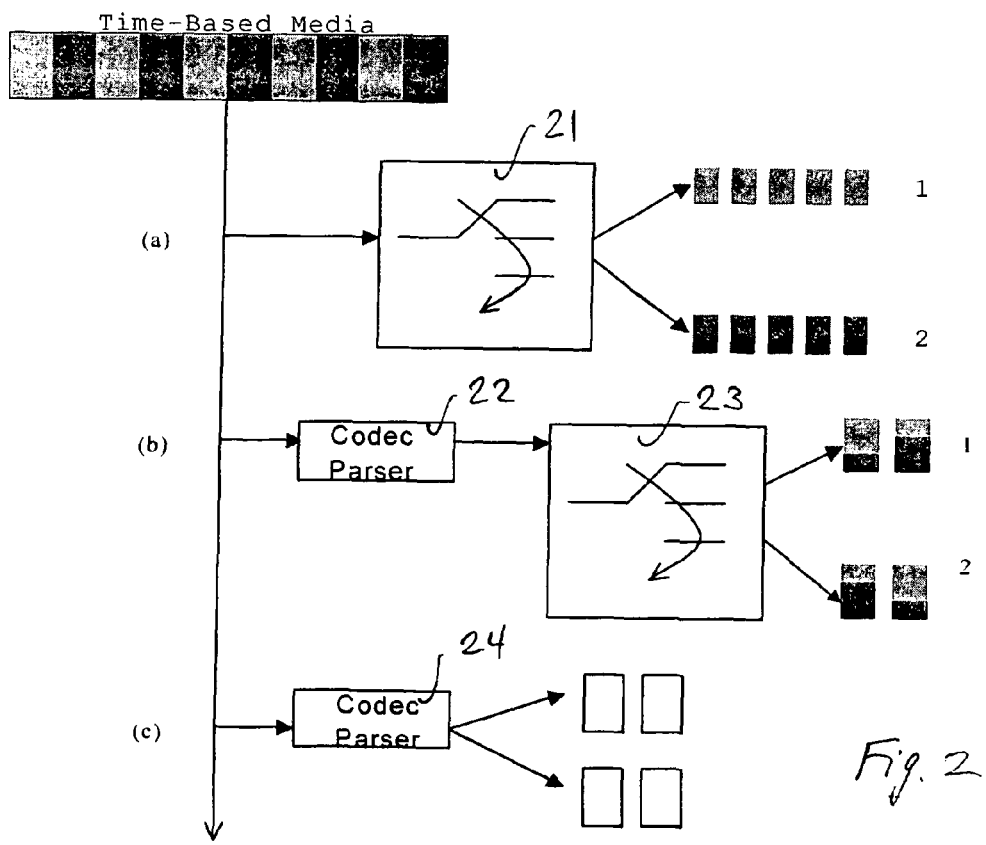
FIG. 2 is a schematic of different partitioning of a media sequence.

FIG. 2 illustrates exemplary variants (a), (b) and (c) for analyzing/splitting a time-based media sequence into subsequences 1 and 2. For specificity of illustration, the sequence is to be split into two subsequences. In variant (a), splitting is by a switch 21 for allocating bits to one or the other of the subsequences based on a chosen splitting scheme which does not rely on knowledge of any coding format adhered to in the sequence 20. In variant (b), the analyzer utilizes certain known coding information. Such information may enable splitting such that at least one of the subsequences may be playable to some extent, albeit abbreviated or at a lower quality, for example. In codec parser 22 the media sequence is first parsed based on the information, and the parsed sequence is then split by a switch 23. Variant (c) provides for splitting by analyzer 24 without any further partitioning prior to delivery. In each of the cases, the original sequence and/or any of the subsequences may be encrypted, then requiring corresponding decryption after delivery.

Figure 3:
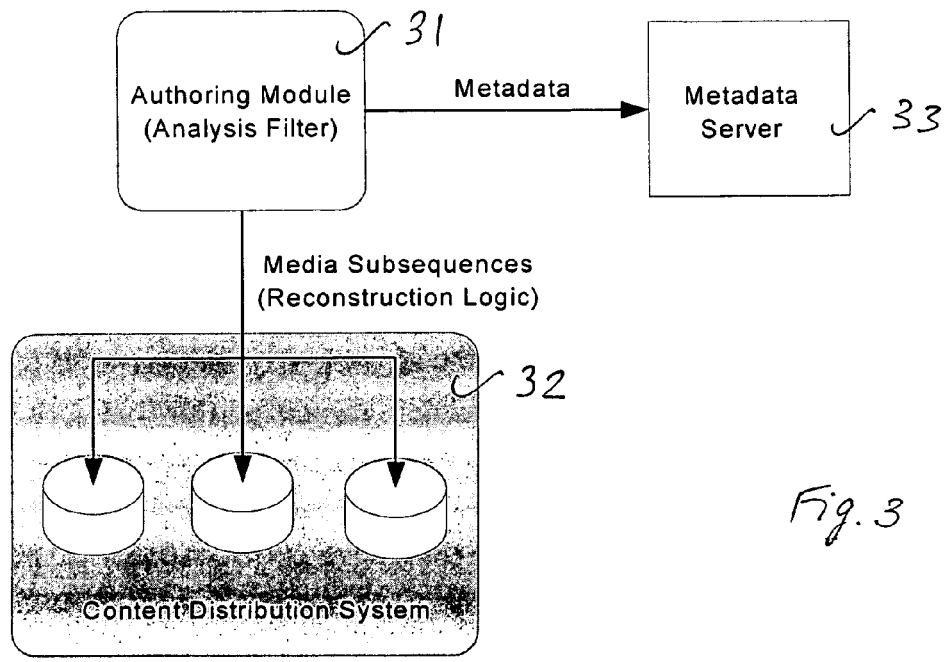
FIG. 3 is a schematic of a relationship between authoring module, metadata server and content distribution system.

FIG. 3 shows authoring module 31 generating media subsequences being delivered to a content distribution system 32 serving three destinations where content may be displayed or archived, for example. The authoring module 31 further generates metadata which are forwarded to a metadata server 33. Metadata provide information which is ancillary to the actual subsequence bit streams, e.g. specifying (i) analysis filter characteristics on whose basis a client can invoke a corresponding reconstruction filter, (ii) the number of subsequences, two or more, which are needed for reconstruction of the original sequence, (iii) identifier information for subsequence and reconstruction logic data, typically in the form of filenames or other locator information, (iv) protocol information for subsequence access, and (v) rules for the client, e.g. as to download sequencing.

In the case of splitting a sequence into a pair of subsequences, one of the subsequences may play the role of a bulk file containing most of the content, and the other that of a complementary delta file. As to subsequence file identification, unique naming is straightforward in a centrally controlled system, by following a chosen format assigned to a media title. In a distributed system allowing independent entities to use the authoring system, a name server can act as a mechanism for preventing subsequence identifier conflicts. The authoring module then can query the name server for unique identifiers for each new media title to be introduced into the distributive system. Further concerning protocols associated with subsequences, different sequences may be specified for downloading or streaming, for example, and for downloading there may be a specification of priority of one subsequence over another.

Figure 4:
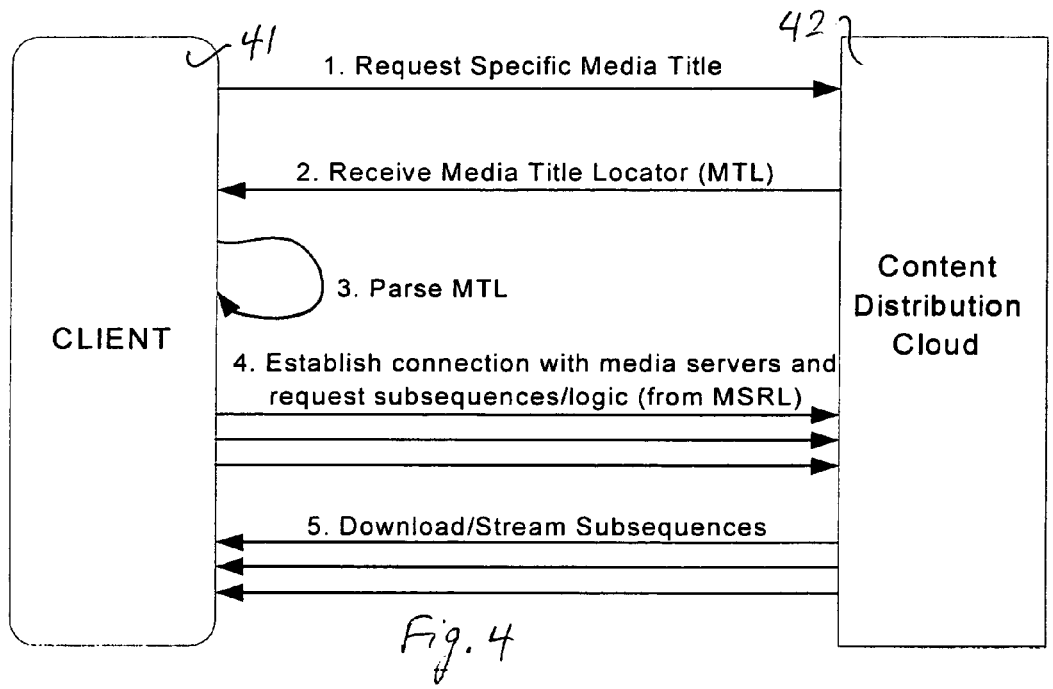
FIG. 4 is a schematic of interaction between a client and a content distribution cloud.

FIG. 4 illustrates a specific instantiation of interaction in a media distribution service, between a client 41 and a content distribution facility or "cloud" 42. Such a service can utilize existing media distribution systems and infrastructures, e.g. the Internet. For a client to access media files, certain supporting systems are provided. In the specific instantiation, a client is considered who requests audio playback of a media title A. On the query, "play A", the client receives a reply from the media distribution service including instructions for deciphering the subsequence access information and for reconstruction of the title from the subsequences.

The reply, designated as Media Title Locator (MTL), includes access information for the subsequences and reconstruction information for their assembly, with information associated with a subsequence being termed as Media Subsequence Resource Locator (MSRL). The MSRL of a subsequence includes media server information, access protocol information, and the subsequence file name. In case the reconstruction logic is not bundled with the subsequence, the MSRL also includes information for accessing the corresponding logic. The MTL includes information on analyzer filter characteristics, the number of subsequences, download priorities, and the like. Accordingly, the MTL includes several MSRL's and other relevant metadata.

The client parses the MTL, and downloads the subsequences and reconstruction logic following the instructions which are included in the MTL/MSRL's. It then reconstructs the media sequence from the media subsequences and their reconstruction logic, for playback of the result by a standard media playback utilities.

Figure 5:
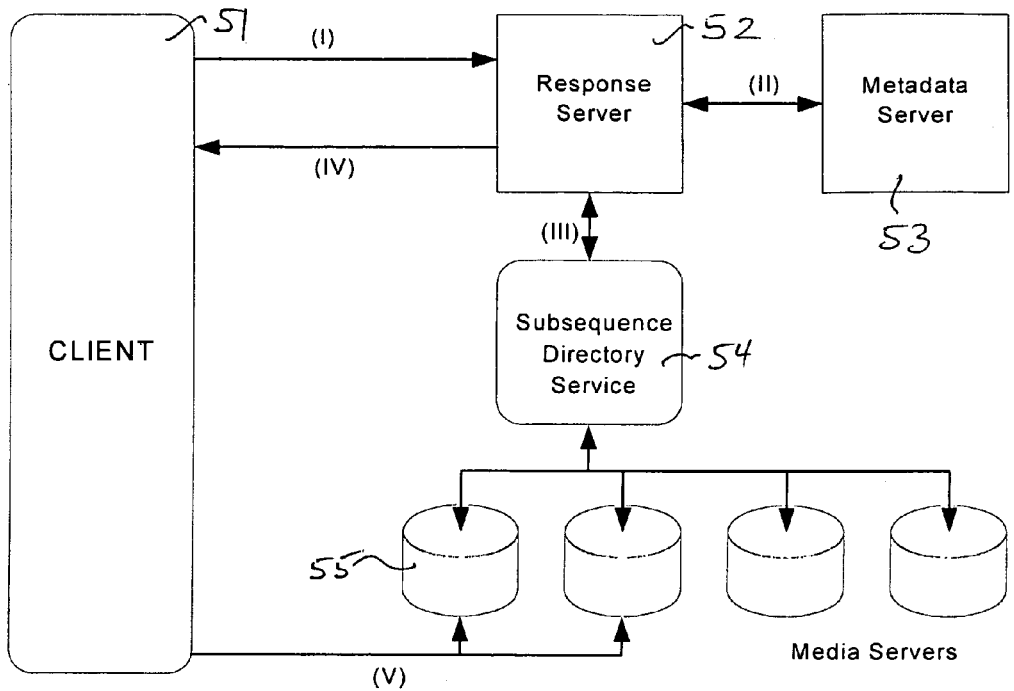
FIG. 5 is a schematic of operation of a media distribution service.

FIG. 5 more specifically illustrates operation of a media distribution service. Shown schematically are a client computer 51, response server 52, metadata server 53 which may be a local application, subsequence directory service 54, and media servers 55, with interactions as follows:

(I) The client 51 submits its request for a media title to the media distribution response server 52.

(II) The response server 52 queries the metadata server 53 to retrieve one or several required subsequences, logic and any other relevant information.

(III) The response server 52 queries the directory service 54 for the locations of the individual subsequences/logic, with the directory service 54 possibly having intelligence for choosing optimal locations in a case where a subsequence can be obtained from different locations.

(IV) The response server 52 combines the information to form the MTL and sends it to the client 51.

(V) The client 51 parses the MTL and opens connection with the individual media servers 55 to obtain the subsequences/logic.

File distribution can involve an available mechanism, e.g. client-server distribution, edge-of-network/push caching, pull caching as in standard passive caching and peer-to-peer file sharing. Such mechanisms may be categorized as being of one of two types, media server versus directory service.

The role of a media server, central or distributed, includes storing the subsequences and serving or streaming them on demand to any requesting client. For example, a central server can be used in a service where a user can download or stream directly from a main service provider in a client-server mode. In a distributed service, the same content can be replicated at multiple locations within a network, e.g. in peer-to-peer file sharing where the media servers can be located on other service users' devices. Similarly, in edge-of-network caching, a file sharing service replicates a file at multiple locations at "edges", such as mirrors and proxies of the network, but in a more controlled fashion as compared with peer-to-peer. A further example for a server includes cache proxies in the network for storing recently requested information.

Subsequences can be made available as downloaded or streamed, and, in streaming, multicasting can be provided for multiple users to listen to the same song, for example. When subsequences are not encrypted or otherwise constrained, they can be copied to disk, transferred, removed, backed up, and the like.

In a directory service, a listing/record is maintained of the locations of the individual subsequences, for supporting a querying interface. In a centralized system, the directory service can be a simple database on a single server. In a decentralized service, e.g. peer-to-peer, multiple users can each have a copy of the same file, with availability varying as a function of who is logged on. In an edge-caching service, where segment files are replicated at different nodes in a network, the directory service is a centralized entity that keeps track of the file locations for directing the client to the nearest cache.

Figure 6:
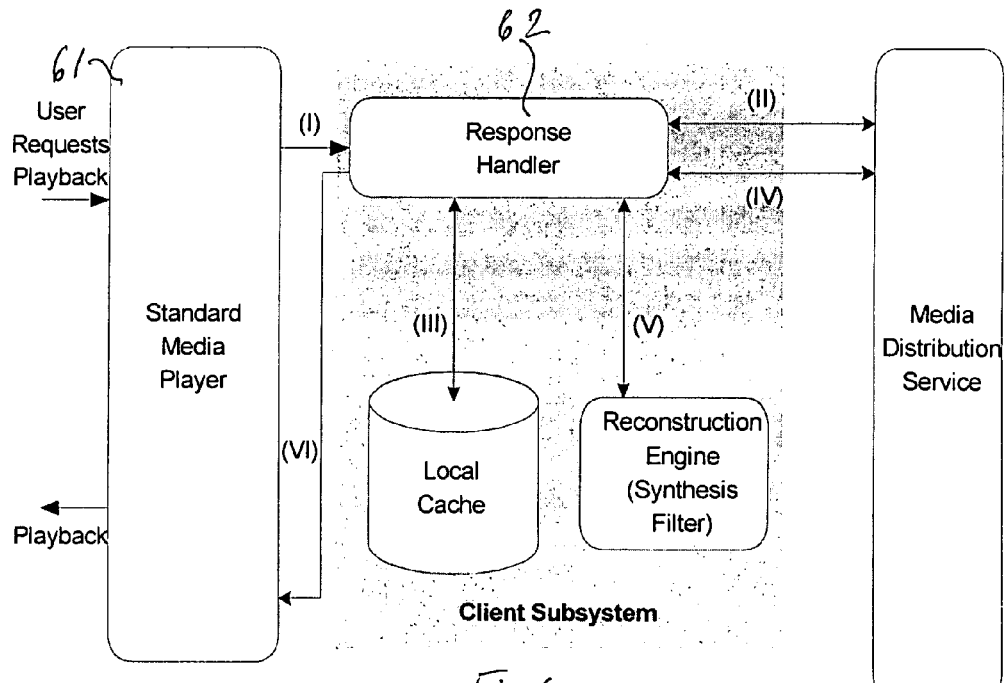
FIG. 6 is a schematic of processing at a client.

FIG. 6 illustrates operation for playback of a media file through a client's media player 61, including the following steps:

(I) The client submits its request to the media distribution response server 62.

(II) The response server queries the metadata server to retrieve subsequence, logic and other related information for the requested media title.

(III) The response server queries the directory service for the locations of the individual subsequences/logic. The directory service may have intelligence for the best locations to choose.

(IV) The response server combines the information to form the MTL and sends it to the client.

(V) The client parses the MTL, opens connection with the individual madia servers and downloads/streams the appropriate subsequences/logic.

Further operations may be included, e.g. checking whether a title being requested already is present in a client's local cache. Such a check may be performed early in processing or later, e.g. after the subsequence locations have been identified, as operations can be arranged in any logical fashion. Also, depending on the reconstruction scheme, the client subsystem can pass along partially reconstructed media files. Where a filtering mechanism is used to allow reconstruction of a low-quality version from a limited number of subsequences of a media file, disconnected playback can be provided for, i.e. from cached subsequences even when the client computer is disconnected from the network.

A media distribution system as illustrated above can be implemented for a variety of uses including an online media locker, online jukebox, chat room, or advertising means, for example. In an online media locker, users can store digital media content they already own, e.g. from a CD, enabling the user to access the content from any computer connected to the network. If allowed by the content provider, storing may be of the fully reconstructed file, or of a lower-quality version. Also, an original file may be split into one portion which can be downloaded, and another to be obtained by streaming from a server whenever playback is desired. In the case of an online jukebox, subscribers have access to music in a database. Users may obtain portions of music for downloading, of a quality which is inadequate for satisfactory playback and requiring a complementary portion which may be obtained by relatively low-rate streaming. To enable users interacting in a chat room simultaneously to listen to the same music, streams can be multicast such that the streams trigger playback. From users, comments may be overlayed on the music.

Other media, e.g. images or video can be distributed correspondingly, with partitioning of original data based on the technique of the invention. And application of the technique is not limited to visual and auditory media, but can extend to tactile media, for example.

Here of particular interest is the delivery of digital media data in compressed form. Compression as exemplified below is used in numerous media applications such as speech, audio and video, including DVDs, broadcasting by cable or satellite, and streaming video over the Internet. A media sequence can be partitioned in the course of compression-encoding prior to transmission, under standards such as MP3, MPEG-2 or MPEG 4, into subsequences which can be decoded by a corresponding standard decoder. Alternatively, a media sequence that is already in compressed format can be read and parsed for partitioning. Depending on the application, the partitioning can be effected during compression, or later on the compressed stream. Similarly, recombination can be effected in the course of decoding or before. In the latter case, decoding need not be immediate, as the recombined stream can be stored for future decoding.

Data Compression

Figure 7:
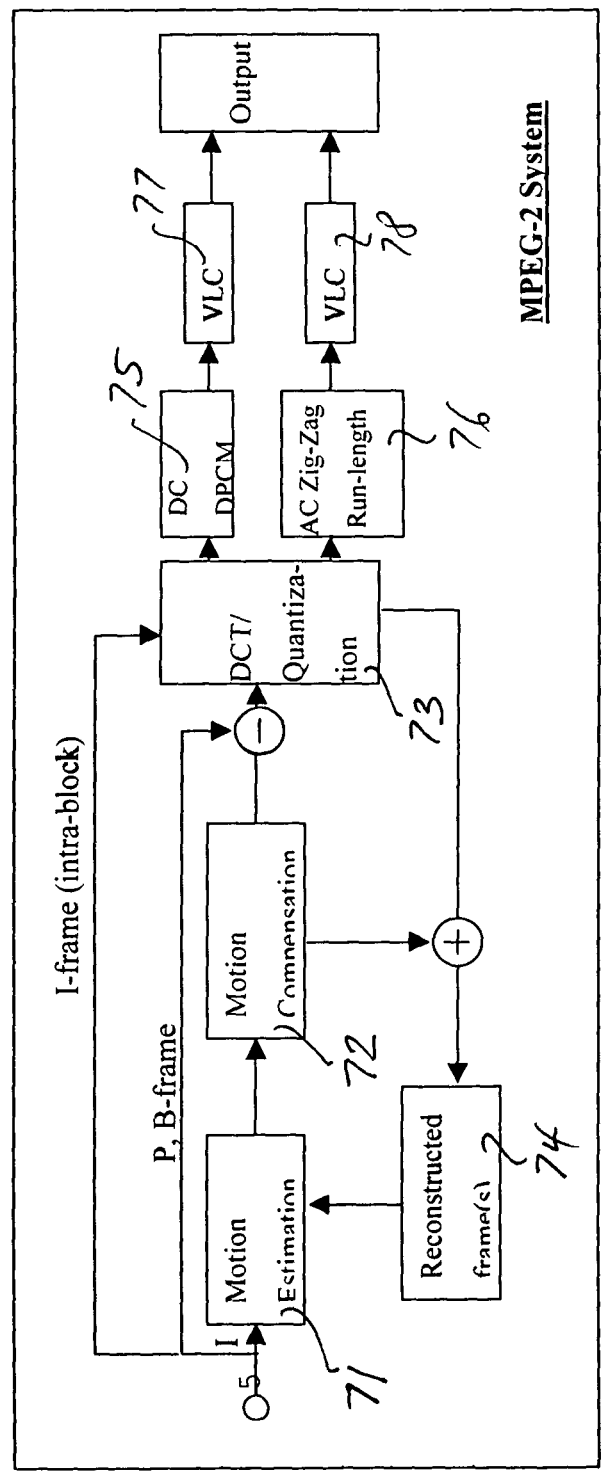
FIG. 7 is a schematic of an encoder for data compression.

With reference to FIG. 7, compression is described for the important case of video. Most video compression methods in current use are based on a similar structure, which can be said for ISO MPEG-2 video coding standard as used in DVD's and in most broadcast applications, the ITU H.26x series of standards for video conferencing, and the ISO MPEG-4 standard used by numerous video streaming and download applications. Certain aspects of the description readily carry over to other uses of lossy compression, as corresponding techniques having similar structure are known in the art, e.g. for audio and speech. For example, specifically, MP3 encoding includes transform and quantization. Likewise, single-image coding algorithms employ a similar structure, though without motion compensation.

FIG. 7 shows a basic structure for a compression system, including a motion estimation module 71, a motion compensation module 72, a transform and quantization module 73, a reconstructed-frame memory 74, a DC differential pulse code modulator (DPCM) 75, an AC zig-zag run length module 76, and variable-length coders 77 and 78. Functionality of modules involves the following:

DCT Transform. From input blocks of pixels, typically blocks of size 8 by 8, the same number of samples of the frequency contents of each block are generated, typically called frequency coefficients. This transform is invertible, so that, if no further processing is performed, the original pixel values can be recovered by applying an appropriate inverse transform. The output coefficients represent the information content of each input signal in the frequency domain. The transforms provides significant energy compaction, i.e., for typical images the number of frequency coefficients needed to provide a good representation of the signal tends to be small. While DCT (Discrete Cosine Transform) is prevalent in current data compression techniques, use of other transforms, e.g. wavelet transforms, is not precluded. Wavelet transforms are used in the JPEG 2000 standard and are likely to find use in video coders.

Quantization.

The frequency coefficients, which can take any real values within an interval that is known beforehand, are quantized to the closest among a discrete set of values. Thus, the quantized coefficients take only a discrete set of values. This operation is lossy, amounting to a many-to-one mapping, and cannot be inverted.

Entropy Coding.

Also known as variable-length coding, the quantized values are represented by specific variable-length codes designed such that the most likely quantized values are assigned shorter code lengths. This process is lossless, i.e., the mapping from quantized value to code is one-to-one, and once the coded symbols have been concatenated for transmission there is a unique way of parsing the bit stream to obtain the individual codes.

Motion Estimation and Compensation.

As video sequences are composed of frames that exhibit substantial temporal correlation, i.e., consecutive frames are very similar, techniques for motion estimation and compensation are used. Motion estimation is only performed at the encoder, while motion compensation is performed at both encoder and decoder. Motion estimation consists of dividing a current frame into blocks, typically 16 by 16 pixels in size, and for each block finding the block in a specified region in the previous frame that most closely matches it. If the match is sufficiently good then a motion vector is transmitted and the difference between the block in the current frame and the best-match block from the previous frame will be compressed and transmitted. Otherwise, if the match is not sufficiently good, the block in the current frame will be compressed directly, without subtraction of any information from the previous frame. There are various modes of motion estimation/compensation based on this principle.

Data Partitioning

For implementation of an exemplary technique in accordance with the invention, the encoder can be modified for removing information in the course of encoding. Then, after such partial removal of information, the output from the encoder can be taken as a first subsequence, with the removed portion as a complementary subsequence. As an alternative, in the interest of efficiency, an analyzer filter can be formed for combining partial decoding of a compressed file with removal of information for partitioning.

For removal of information it is desired to adhere to syntax-compatible strategies in the sense described above, for at least one of the subsequences, typically the one containing the bulk data. The following are examples of such strategies:

AC Coefficients.

In a standard video encoder, the AC coefficients are coded with a variable length code (VLC) where two dimensions are encoded, run-length and magnitude. Escape codes are used for all values outside the table of codes. According to one embodiment of the invention, selected AC coefficients are set to a specified value, e.g. zero, with the actual value placed in a supplementary stream. Because of the run lengths, if any coefficient is changed to zero, as the run of zeros now has become longer, this alters not only its code but also the code before it. Therefore, some form of re-encoding of the block may be needed.

Zeroing the AC coefficients distorts the image texture, leaving an unappealing, though recognizable sequence. Another option is to set the sign of certain AC coefficients to be positive. This creates highly distorted bit streams with very small supplemental streams, as only one bit needs to be written for every non-zero AC coefficient. In this case no re-encoding is necessary, as changing the sign does not affect the Huffman code for the magnitude-run length. A third option is to remove the coefficient and replace it with a number indicating the distance to the next bits that will be changed. A fourth option is to remove the coefficient without replacement, resulting in a shift, by one, of all the following coefficients in the zig-zag scan.

The AC coefficients are appealing for encoding a distance because their range is from −2048 to 2048 (but not zero). This is long enough in most cases, and, if need be, two coefficients can be used to code the jump, making for 24-bit distance. Adding this much error to the AC values creates a highly degraded image, where it is practically impossible to recognize the original image. However, a large part of the degradation in quality stems from long distances resulting in large coefficients. Therefore, someone trying to increase the quality of the subsequences might be able to detect these larger-than-usual values and set them to zero.

The AC methods considered share a property in that the larger the difference between an original value and its replacement, the greater the loss in image quality. Such quality scalability is advantageous for customizing the level of quality in a first subsequence.

Comparing the different options in terms of complexity, zeroing coefficients is the most complex, requiring some recoding of the block. Resetting coefficient signs is simple and results in greater distortion. Replacing coefficients has the advantage of a recombination filter of low complexity, as recombination can skip bits without parsing them, but provides less control over the quality of a resulting first subsequence. Removing coefficients without replacement has complexity similar to zeroing, with a potential advantage in introducing significant quality degradation even if just a single coefficient is removed.

For choosing which AC coefficients to change, the following are among options: (i) the N largest coefficients of a block, (ii) the first N coefficients of a block, and (iii) the coefficients that provide the maximum average energy over a subset of the sequence, e.g. a frame or a group of pictures (GOP). A further possibility lies in selection of blocks for coefficient removal, e.g. Intra blocks only, or luminance component only. Some of these options then require that auxiliary information be provided in the supplemental stream(s). For example, if a different set of N coefficients is chosen on a frame-by-frame basis, the set should be characterized for each frame.

DC Coefficients.

DC coefficients are differentially coded, with a new sequence starting at the beginning of each line of 8 by 8 blocks. The first value of a new line is between 0 and 255. The difference values range form −255 to 255. All coefficients are variable-length coded. Altering the DC vectors impairs the fidelity of the video and has a number of options. Zeroing the vectors produces marginally acceptable video in which some of the video contents can be made out. As for the AC coefficients, altering the signs of the DC differentials is another choice. Because the range of differential vectors is from −255 to 255, if all signs are set in one direction, e.g. all positive, or even if a single sign is changed on a chosen line, the predicted DC value of a block can be outside the 0-255 range. Thus, an attacker might be able to determine that a particular sign should be changed when out-of-range coefficients are observed.

Many practical media players simply truncate the DC values if they fall out of range. Still, if a sufficient number of DC values are changed, our experiments indicate that some recovery is possible by utilizing the out-of-range values, though images of good quality are difficult to recover because there are many possible combinations of sign values, inhibiting automatic differentiation. This option offers essentially complete scrambling of the video frames. As for the AC coefficients, it is possible to remove the DC values and replace them by values that indicate the number of bits to be skipped to reach the next bit position that has been modified. As a benefit, the complexity of the recombination filter is reduced. Also, as for the AC coefficients, removal of information can be from all blocks, from the Intra blocks alone, from the luminance blocks alone, or from both luminance and chrominance blocks.

Motion Vectors.

The motion vectors (MV) are coded using 3 elements for x and y displacements, a magnitude element, the normal motion vector, and a residue. Also, there is ancillary information, e.g. indicating whether full-pixel or half-pixel is used, or, in the case of B-frames, whether forward, backward or combined prediction was used. Modifying motion vectors is less effective in slow moving video, and even in panning and fast motion sequences the viewer may be able to follow by tracking the I-frames. The length of the GOP makes a significant difference in video quality, as longer GOP's are more distorted than short ones.

Here again zeroing out all MV's is one option, taking an acceptable number of bits as motion vectors are coded only once per macro-block of four 8 by 8 pixel blocks. Other possibilities include eliminating the sign information in the MV's. However, in changing the sign of the MV's there may be risk. Motion vectors are coded differentially, and their allowed range is relatively small. Unlike AC and DC coefficients, out of range values are not readily dealt with. As illegal MV's are usually not checked for, they can cause memory to be read from locations beyond the image's range. This can add large distortions, making it likely that some decoders would be unable to decode such streams.

A further option involves eliminating the MV temporal direction information for each block of a B-frame. As is typical in MPEG syntax, a code table can be used to represent each of the possible values of this information, along with other parameters. Thus, when the temporal direction information takes a certain value, the code that is used is not unique but depends on the values taken by the other parameters encoded. For elimination of the MV temporal direction information therefore, one multi-bit code has to be replaced by another where the temporal direction has been modified. Other options that are applicable to most of the above include coding only P-frames or only one of the MV directions.

Combination of Techniques.

It is feasible to change multiple elements of the bit stream. Not only will this reduce the quality, but may also make unauthorized decoding more difficult, thus enhancing security. Also, certain techniques as described above can be combined with known scrambling techniques. For example, after removing one or more AC coefficients, the order of the remaining coefficients can be altered according to a standard scrambling technique.

Complexity Issues.

If the combine filter is tightly coupled with the decoder, then the stream needs to be decoded only once, and the techniques described here are straightforward to implement and will add only minor processing requirements to the decoder. Otherwise, the stream has to be partially decoded, partially re-encoded and then sent to the second decoder for decoding and display. Partial decoding need not require the iDCT or the motion compensation, but still require decoding of the MV's for maintaining synchronization with the stream, as well as other elements, including the AC coefficients. Further speed-up can be realized by skipping complete frames in the process, i.e., by not removing any information from some of the frames.

Complexity can be reduced also by including in the modified bit stream codes that indicate the number of bits to be skipped for reaching the successive locations where removed bits have to be reinserted. One option here is to code in a swap-and-skip format, where the filter swaps a number of bits, e.g. an AC coefficient, and then skips ahead and repeats the process. It may be feasible to embed the skip section within the primary stream by placing it at points where it will be skipped by the decoder or overwritten by the filter as it works its way through the file. For example, each DC coefficient may be replaced with the number of bits until the next DC coefficient. The supplemental stream then contains only the coefficients packed together, and the filter can run through the file quickly, swapping and skipping.

In implementing such a seek-and-swap method, one concern arises from the fact that the number of bits allowable for skipping actually depends on what the MPEG format permits for a specific coefficient. As an example, if the DC coefficients are used then there is a range of 256 values for unpredicted blocks, and of 512 for predicted blocks. Therefore, skipping is constrained to 256 or 512 bits. While most block sizes are considerably less than 256 bits, larger blocks may have to be accommodated. AC coefficients may present a better choice, as they provide 4096 bits of precision. However, if AC values are used to convey this information, an attack consisting of zeroing out the coefficients may be successful, yielding a degraded but perhaps useable decoded sequence. With skip-and-swap techniques there is a further concern with quality control in that no choice is available for the values to be inserted, as they correspond to the length in number of bits of the segment to be skipped.

Choice of method will depend strongly on how closely the combining filter is linked to the decoder. If the linking is close, skip-and-swap methods may be decided against as less resilient to error and more intensive in overhead. In this case, changing a combination of the AC and DC signs is preferable. This yields a supplemental stream with typical values of less than one percent of the original file size, without changing the size of the original. If the decoder is not closely linked, it may be preferable to code the bit offset in the DC coefficient, with an escape code for values out of range which then can use the first AC coefficient. At high speed, potentially, this will eliminate enough information to render the residual stream essentially unrecognizable. If a very small stream is needed, another possibility lies in coding the offset to the next GOP in the signs of the DC blocks, so that most of the stream would not need to be decoded, only the I-frames.

Choice from among partitioning techniques and combinations of techniques can be made by the content owner or the service provider, for meeting requirements on the quality of the bulk file and the size of the supplemental stream.

A technique of the invention can provide for removal of either DC or AC information, selectively depending on the degree of image degradation desired for a scene in a video sequence. Such dependence can be selected to advantage for providing a file with a preview functionality, for example. When informed as to which scenes have been degraded lightly, a user can view these scenes as a preview of the complete sequence.

Optimization of Data Removal

As described, the level of protection offered by our techniques depends on the number of values that can result in a valid bit stream in the position where data has been removed. For example, when a differentially encoded DC coefficient is removed, there are exactly 512 different values possible in that position. To reconstruct the original compressed signal, a hacker would have to guess which among the 512 possible values is the right one. Likewise, if an AC coefficient has been removed, there are 4096 possible values to replace the missing coefficient. In practice, all the values for the missing information are not equally likely because the original coefficients themselves are not equally likely. As an example, even though a differentially coded DC coefficient can take any of 512 values, coefficient values close to zero are considerably more likely. Thus, the probability distribution of each coefficient might be used by an attacker in order to limit the number of values to be tested. The distribution of these probabilities is linked also to the cost of compressing the coefficient values that have been removed.

In a pilot implementation, for deciding which data to remove we have used an extension of the Lagrange multiplier technique. In formulating and solving we set the goal of information removal such that: (i) the number of bits required to represent the removed information is small, limiting the size of the supplemental stream, (ii) the increase in distortion when removing the information is large, and (iii) the number of possible alternatives among which an attacker has to guess is also large. Formulation is facilitated by notation as follows: Ri—the number of bits needed to represent the removed information in a supplemental stream, Di—the increase in distortion caused by the removal, Ni—the total number of options to choose from in order to restore the data to its original quality. As an example, when the DC sign is set to "always positive", Ri equals one bit per DC coefficient, Di depends on both the change in the coefficient itself and on the subsequent DC coefficients which will be affected in differential coding, and Ni equals 2. For optimal information removal, the goal can be the maximizing of a weighted cost function, namely Di+k·Ni, where k is a Lagrange multiplier allowing emphasis on distortion or level of protection in optimization.

When considering the number of options available for specific data that has been removed, the number of "good" options can be approximated by the entropy of the random variable representing them. For example, when a sign is removed, the two options typically have the same likelihood. Alternatively, when an AC coefficient has been removed, there may be up to 4096 values available for that coefficient; typically however, only the smaller $2^{Hi}$ values are a likely choice, where Hi is the entropy of the coefficient. Thus, an attack may succeed just by choosing among those values.

A strategy can take into account the recognition that in removing coefficients with a certain entropy Hi, the total number of combinations of coefficients is $2^{nHi}$ rather than $2^{nNi}$, where n is the number of coefficients that have been removed and Ni is the number of bits required to represent the uncompressed coefficient. Thus, the level of protection achieved is directly related to the number of bits required to represent the information that was removed, and an approximate formulation for optimization calls for maximizing Di+k·Ri, where a large value is desirable for Ri in that it represents a large number of options to be chosen in order to restore the data.

Techniques of the invention can be implemented in software, for a processor to follow program instructions stored in memory. It was with such an implementation that experimental results were obtained as presented below. For commercial use, in the interest of enhanced efficiency, use of firmware and/or dedicated hardware is indicated, e.g. at a network gateway. Whether by hardware, firmware or software, the techniques can be implemented as separate modules, or their functions can be integrated in encoder and decoder modules.

Experimental Results

Experiments were carried out with a stream of 20,329,573 bytes, of a 60-second clip taken from the movie True Lies. The results are shown in Table 1, where the left-most column identifies the different splitting strategies used. Table 1 further shows the size of the supplemental stream which was split off using the respective strategy, before as well as after compression, and the size of the main stream after removal of the supplemental stream. The notation "same" indicates high stream entropy making compression less relevant. Size values shown in parentheses are approximated, by the entropy value. The MPEG 2 Huffman Table was used for the other, exact values given for the compressed supplemental stream.

The results demonstrate reverse scalability as achieved by techniques of the invention. The size of the bulk file remains close to the size of the original file, and the supplemental streams are small by comparison. Even the supplemental file including the most information, namely the one conveying selected AC coefficients, remains less in size than 10% of the original file. When only the signs are removed, either of AC or DC coefficients, respective supplemental files of approximately 1% and 0.2% in size are noted. Techniques including removal of the DC coefficients or their sign result in highly degraded video sequences. Upon removal of the AC coefficients or their sign there results a moderate decrease in quality.

TABLE 1

| Test | Supplemental stream | | Main Stream |
| --- | --- | --- | --- |
| | Uncompressed | Compressed* | |
| DC signed | 48,818 | same | 20,329,573 |
| DC rand | 593,684 | 417,822 70% | 20,544,435 |
| DC zeroed | 593,684 | 417,822 70% | 20,087,643 |
| AC signed (first 10) | 250,205 | same | 20,329,573 |
| AC zeroed (first 10) | 7,124,195 | (1,300,000) 17% | 19,064,058 |
| AC rand (first) | 1,385,261 | (350,000) 35% | 21,620,664 |
| MV zeroed | 2,639,989 | 571,687 22% | 19,882,784 |

The invention claimed is:

1. A method for delivering media data, comprising the steps of:
   (a) forming a plurality of subsets of the data, comprising a first subset which conveys a first, degraded-quality representation of the data and at least one further subset here designated as a second subset which in combination with the first subset conveys a second representation of the data with a quality superior to the first representation, and with the size of the first subset being chosen maximized the second subset being chosen with maximized randomness and minimized size subject to a constraint on the quality of the first representation, the constraint having been chosen for a sufficiently high degree of quality degradation for content protection;
   wherein the said randomness is quantified based on entropy of data bits in the second subset;
   wherein the step of second subset being chosen comprises the step of optimization utilizing a cost function that combines degradation of the first subset and the entropy of the second subset; and
   (b) delivering at least the first subset to at least one destination.

2. The method of claim 1, wherein step (b) comprises delivering to a plurality of destinations.

3. The method of claim 1, wherein step (b) comprises delivering the second subset to the destination.

4. The method of claim 3, wherein the destination comprises a peer in a peer-to-peer transmission network.

5. The method of claim 4, wherein the first subset is transmitted from another peer.

6. The method of claim 5, wherein the second subset is transmitted from a server.

7. The method of claim 1, wherein the second subset is encrypted.

8. The method of claim 7, wherein the second subset is delivered through a secure network.

9. The method of claim 1, wherein step (b) comprises at least one of downloading and streaming.

10. The method of claim 1, wherein the data comprises audio.

11. The method of claim 10, wherein the data is in MP3 format.

12. The method of claim 1, wherein the data comprises video.

13. The method of claim 12, wherein the data is in one of MPEG-2 and MPEG-4 format.

14. The method of claim 12, wherein forming the first subset comprises changes in at least one of AC and DC coefficients of the data.

15. The method of claim 14, wherein forming the first subset comprises replacing selected coefficients of the data with a specified value.

16. The method of claim 15, wherein the specified value is zero.

17. The method of claim 14, wherein forming the first subset comprises replacing the sign of selected coefficients with a specified sign.

18. The method of claim 14, wherein forming the first subset comprises replacing selected coefficients with a value which indicates distance to subsequent bits to be changed.

19. The method of claim 14, wherein forming the first subset comprises removing selected coefficients without replacement.

20. The method of claim 14, wherein forming the first subset comprises removing information from all data blocks.

21. The method of claim 14, wherein forming the first subset comprises removing information from at least one of Intra blocks, luminance blocks and chrominance blocks.

22. The method of claim 12, wherein forming the first subset comprises removing of motion vector information.

23. The method of claim 22, wherein forming the first subset comprises at least one of zeroing, removing sign information, and removing temporal direction information.

24. The method of claim 22, wherein removing of motion vector information is effected on P-frames.

25. The method of claim 22, wherein removing of motion vector information is effected on a selected one motion-vector direction.

26. The method of claim 1, wherein forming the subsets is predicated on a Lagrange multiplier optimization technique.

27. A delivery system for media data, comprising:
a partitioning module for forming a plurality of subsets of the data, comprising a first subset which conveys a first, degraded-quality representation of the data and at least one further subset here designated as a second subset which in combination with the first subset conveys a second representation of the data with a quality superior to the first representation, and with the second subset being chosen with maximized randomness and minimized size subject to a constraint on the quality of the first representation, the constraint having been chosen for a sufficiently high degree of quality degradation for content protection; and
a delivery module for delivering at least the first subset to at least one destination;
wherein the said randomness is quantified based on entropy of data bits in the second subset;
wherein the step of second subset being chosen comprises the step of optimization utilizing a cost function that combines degradation of the first subset and the entropy of the second subset.

28. The delivery system of claim 27, wherein the partitioning module is functionally coupled to an encoder module.

29. The delivery system of claim 27, wherein the partitioning module is integrated into an encoder module.

30. The delivery system of claim 27, wherein the delivery module comprises an encryption module for encrypting the second subset for delivery.

31. The delivery system of claim 27, wherein the delivery module is connected for delivery of the second subset over a secure network.

* * * * *